US012699552B2

(12) United States Patent
Hicks et al.

(10) Patent No.: US 12,699,552 B2
(45) Date of Patent: Aug. 4, 2026

(54) TAGGING DETERMINISTIC CODE IN ARTIFICIAL INTELLIGENCE-GENERATED CODE

(71) Applicant: INTERNATIONAL BUSINESS MACHINES CORPORATION, Armonk, NY (US)

(72) Inventors: Andrew C. M. Hicks, Highland, NY (US); Ryan Lo, Poughkeepsie, NY (US); Michael Gagliardi, Somerset, MA (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 18/397,798

(22) Filed: Dec. 27, 2023

(65) Prior Publication Data

US 2025/0217118 A1 Jul. 3, 2025

(51) Int. Cl.
*G06F 8/40* (2018.01)
*G06N 3/08* (2023.01)

(52) U.S. Cl.
CPC ................. *G06F 8/40* (2013.01); *G06N 3/08* (2013.01)

(58) Field of Classification Search
CPC ................................... G06F 8/40; G06N 3/08
USPC .................................. 717/106–116, 136–136
See application file for complete search history.

(56) References Cited

U.S. PATENT DOCUMENTS

| | | | | |
|---|---|---|---|---|
| 6,832,367 | B1 * | 12/2004 | Choi ................... | G06F 11/3636 |
| | | | | 717/124 |
| 11,403,519 | B2 * | 8/2022 | Shah ...................... | G06F 9/5094 |
| 11,948,101 | B2 * | 4/2024 | Epperlein ................ | G06N 7/01 |
| 2020/0218998 | A1 * | 7/2020 | Epperlein .............. | G06N 20/00 |
| 2022/0004365 | A1 * | 1/2022 | Pujar ...................... | G06N 3/088 |

FOREIGN PATENT DOCUMENTS

CN 120215907 A 6/2025

OTHER PUBLICATIONS

Nagaraja et al., "Deterministic Implementations for Reproducibility in Deep Reinforcement Learning", 2019, arXiv, 17 pages. (Year: 2019).*
Ouyang et al., "LLM is Like a Box of Chocolates: the Non-determinism of ChatGPT in Code Generation" , 2023, arXiv, 12 pages (Year: 2023).*
Software Engineering Stack Exchange, "Testing: deterministic or non-deterministic?", 2017, retrieved from http://softwareengineering. stackexchange.com:80/questions/221632/ , 3 pages. (Year: 2017).*

* cited by examiner

*Primary Examiner* — Ted T. Vo
(74) *Attorney, Agent, or Firm* — Onyx IP Group

(57) ABSTRACT

Tagging deterministic code in artificial intelligence-generated code, including: receiving code generated by a generative artificial intelligence (AI) model; identifying at least one portion of code by identifying at least one of: one or more portions of deterministic code or one or more portions of non-deterministic code; and tagging the identified at least one portion of code.

24 Claims, 5 Drawing Sheets

100

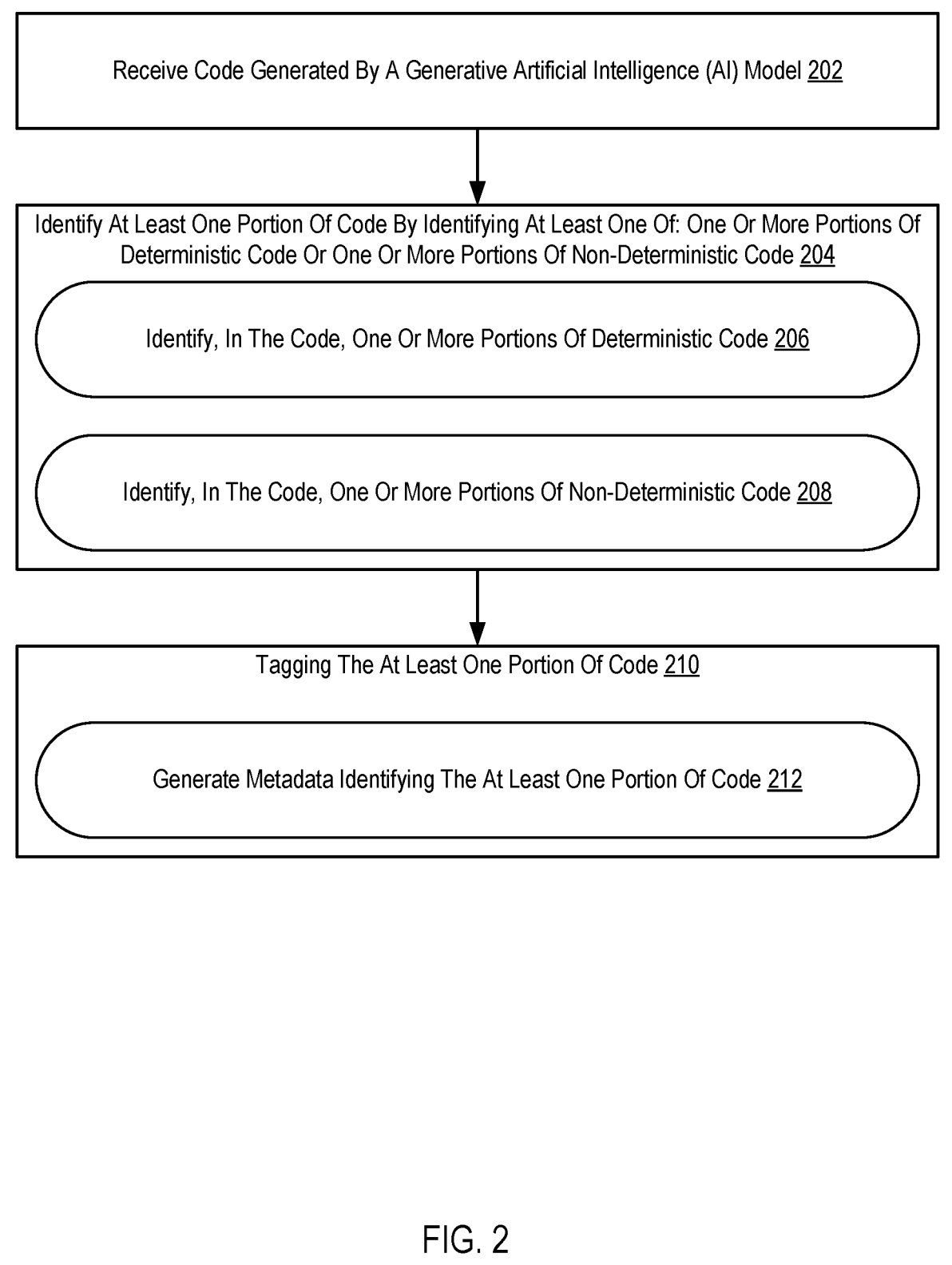

Receive Code Generated By A Generative Artificial Intelligence (AI) Model 202

Identify At Least One Portion Of Code By Identifying At Least One Of: One Or More Portions Of Deterministic Code Or One Or More Portions Of Non-Deterministic Code 204

Identify, In The Code, One Or More Portions Of Deterministic Code 206

Identify, In The Code, One Or More Portions Of Non-Deterministic Code 208

Tagging The At Least One Portion Of Code 210

Generate Metadata Identifying The At Least One Portion Of Code 212

FIG. 2

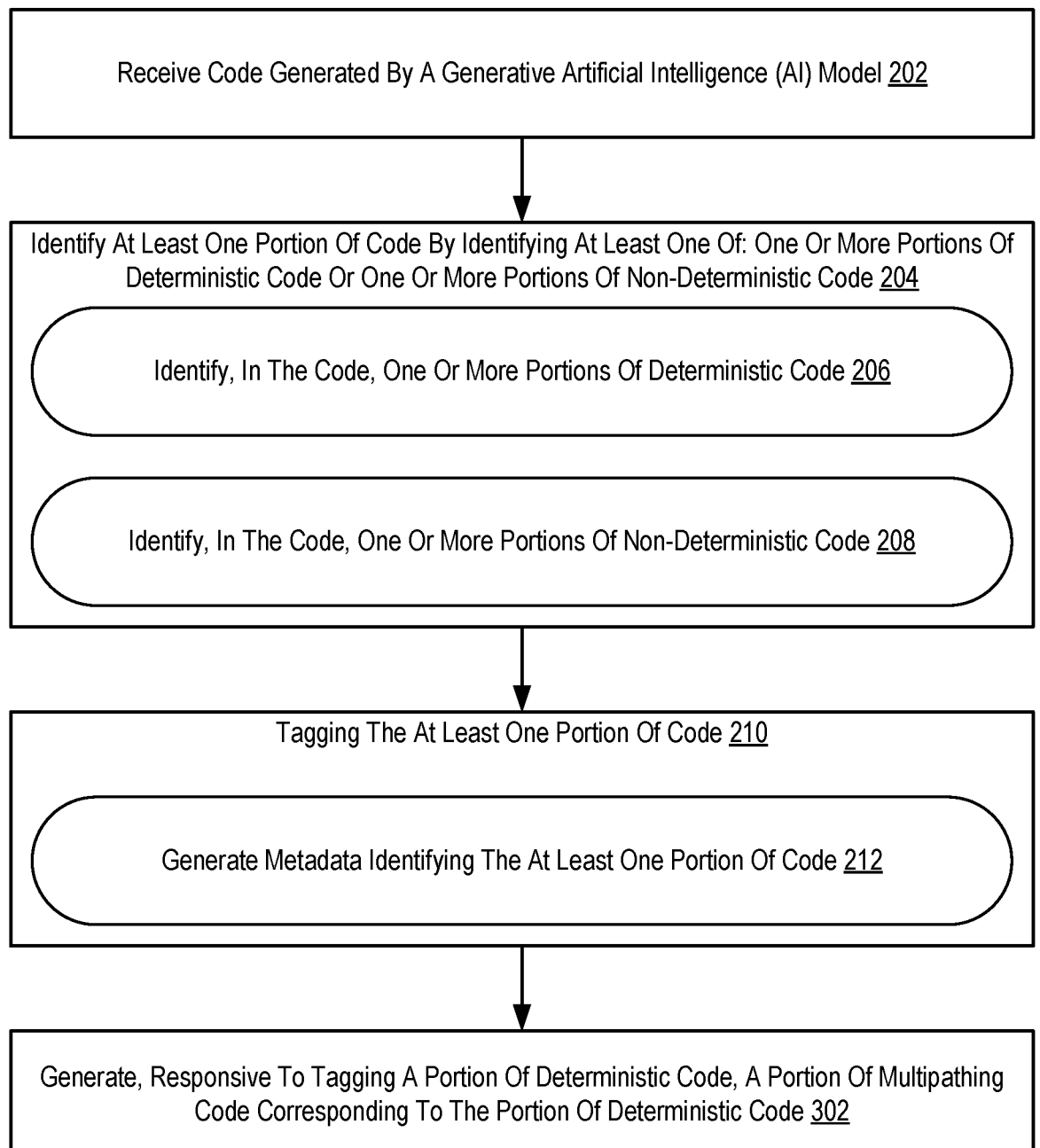

Receive Code Generated By A Generative Artificial Intelligence (AI) Model 202

Identify At Least One Portion Of Code By Identifying At Least One Of: One Or More Portions Of Deterministic Code Or One Or More Portions Of Non-Deterministic Code 204

Identify, In The Code, One Or More Portions Of Deterministic Code 206

Identify, In The Code, One Or More Portions Of Non-Deterministic Code 208

Tagging The At Least One Portion Of Code 210

Generate Metadata Identifying The At Least One Portion Of Code 212

Generate, Responsive To Tagging A Portion Of Deterministic Code, A Portion Of Multipathing Code Corresponding To The Portion Of Deterministic Code 302

FIG. 3

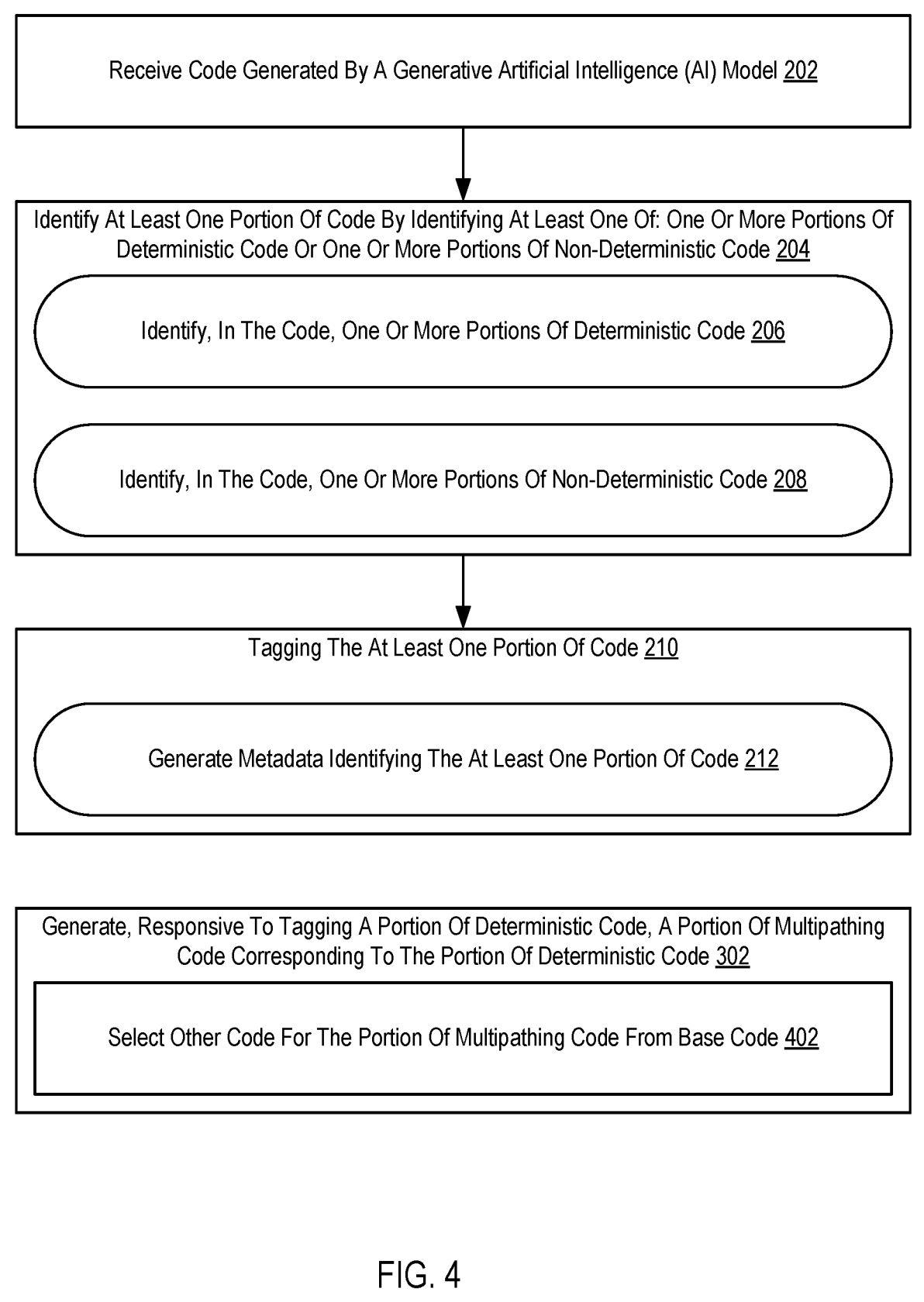

Receive Code Generated By A Generative Artificial Intelligence (AI) Model 202

Identify At Least One Portion Of Code By Identifying At Least One Of: One Or More Portions Of Deterministic Code Or One Or More Portions Of Non-Deterministic Code 204

Identify, In The Code, One Or More Portions Of Deterministic Code 206

Identify, In The Code, One Or More Portions Of Non-Deterministic Code 208

Tagging The At Least One Portion Of Code 210

Generate Metadata Identifying The At Least One Portion Of Code 212

Generate, Responsive To Tagging A Portion Of Deterministic Code, A Portion Of Multipathing Code Corresponding To The Portion Of Deterministic Code 302

Select Other Code For The Portion Of Multipathing Code From Base Code 402

FIG. 4

TAGGING DETERMINISTIC CODE IN ARTIFICIAL INTELLIGENCE-GENERATED CODE

BACKGROUND

The present disclosure relates to methods, apparatus, and products for tagging deterministic code in artificial intelligence-generated code. Generative artificial intelligence (AI) may be used to generate code, such as application source code. Such code may be based on a prompt provided to a generative AI model describing the functionality that the code should perform. Such code may also include conversions performed by the generative AI model from one programming language to another. The AI-generated code may include deterministic code that always produces the same set of outputs given the same inputs. However, the AI-generated code may also include non-deterministic code that may produce unreliable or non-consistent outputs despite using the same set of inputs. This non-deterministic code may introduce unwanted entropy into a system, leading to errors or performance degradation.

SUMMARY

According to embodiments of the present disclosure, various methods, apparatus and products for tagging deterministic code in artificial intelligence-generated code are described herein. In some aspects, tagging deterministic code in artificial intelligence-generated code includes receiving code generated by a generative artificial intelligence (AI) model; identifying at least one portion of code by identifying at least one of: one or more portions of deterministic code or one or more portions of non-deterministic code; and tagging the identified at least one portion of code. This provides the advantage of identifying deterministic or non-deterministic portions of code in AI-generated code, the importance of which is first recognized by this disclosure. In some aspects, an apparatus may include a processing device; and memory operatively coupled to the processing device, wherein the memory stores computer program instructions that, when executed, cause the processing device to perform this method. In some aspects, a computer program product comprising a computer readable storage medium may store computer program instructions that, when executed, perform this method.

In some aspects, tagging deterministic code in artificial intelligence-generated code may also include generating, responsive to tagging a portion of deterministic code, a portion of multipathing code corresponding to the portion of deterministic code. This enables multipathing code for portions of known deterministic code, which may be more suitable for multipathing compared to non-deterministic code. In some aspects, tagging deterministic code in artificial intelligence-generated code may also include providing, to the generative AI model, data describing the identified at least one portion of code. This provides the advantage of reinforcing generation of deterministic code and mitigating generation of non-deterministic code by the generative AI model.

BRIEF DESCRIPTION OF THE DRAWINGS

FIG. 2 sets forth a flowchart of an example method for tagging deterministic code in artificial intelligence-generated code in accordance with some embodiments of the present disclosure.

FIG. 3 sets forth a flowchart of another example method for tagging deterministic code in artificial intelligence-generated code in accordance with some embodiments of the present disclosure.

FIG. 4 sets forth a flowchart of another example method for tagging deterministic code in artificial intelligence-generated code in accordance with some embodiments of the present disclosure.

DETAILED DESCRIPTION

Figure 1:
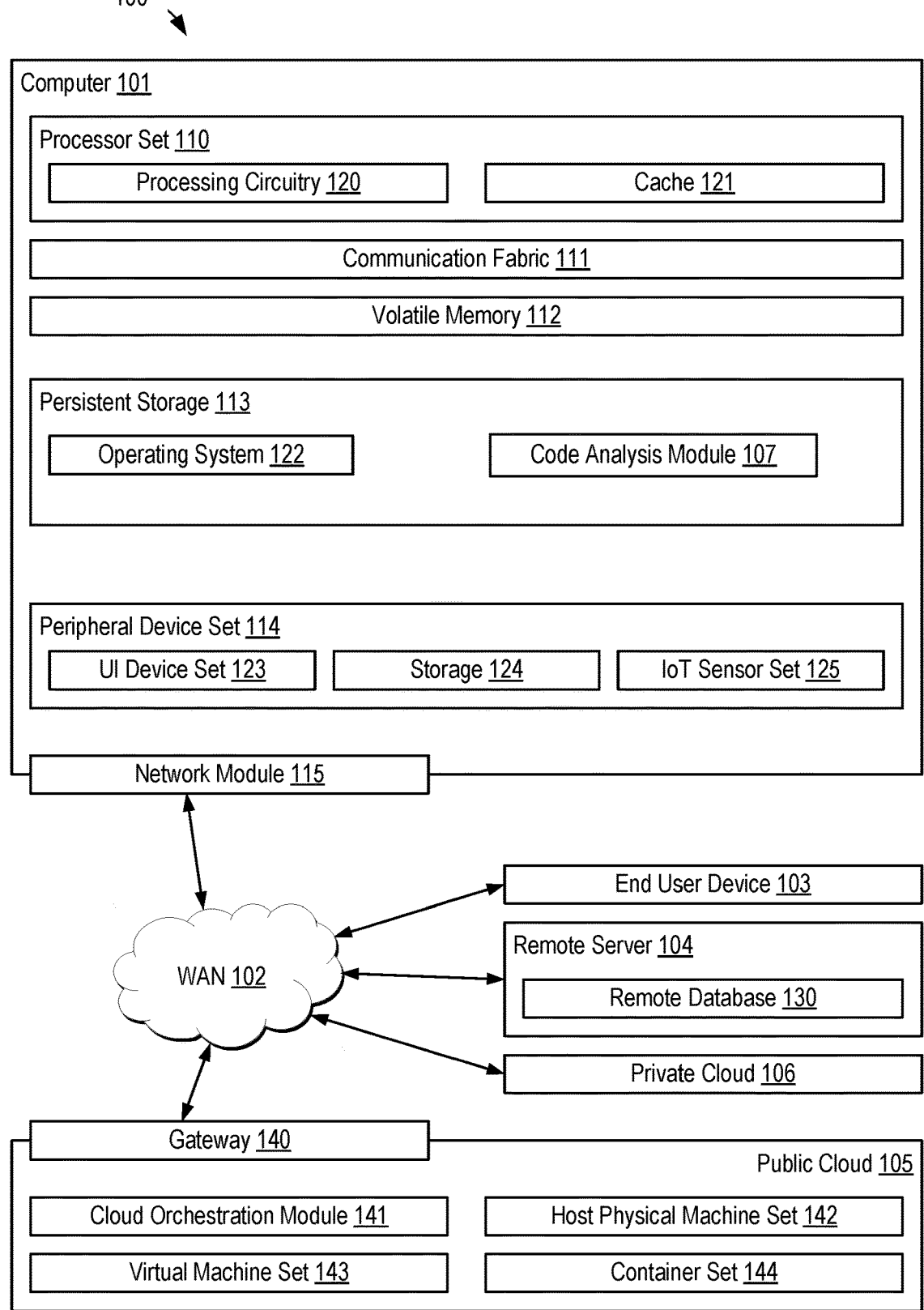
FIG. 1 sets forth an example computing environment for tagging deterministic code in artificial intelligence-generated code in accordance with some embodiments of the present disclosure.

Deterministic code is code that will always produce the same output if given the same set of inputs. Put differently, deterministic code is operationally consistent code. Sequences of deterministic code may be used as examples of known truth when training generative artificial intelligence (AI) models to generate code. Generative artificial intelligence (AI) uses models such as neural networks to generate content, including code such as source code, in response to prompts. For example, generative AI models may be used to generate code based on a description of the functionality that the generated code is to implement. As another example, generative AI models may be used to convert code from one programming language to another by providing the base code as input to the generative AI model.

A generative AI model may produce non-deterministic code. For example, there may be underlying structural or architectural issues with a program that may produce unreliable or non-consistent outputs despite using the same set of inputs. When used in a system and accepts as a known truth, the system will inherit a level of entropy that may lead to errors or bugs. Accordingly, it may be advantageous to identify portions of deterministic and non-deterministic code in AI-generated code to provide feedback to the generative AI model to reinforce the learning of its deterministic outputs while mitigating future generation of non-deterministic code.

Identification of deterministic and non-deterministic code may also be useful when introducing multipathing code into a program or application. Multipathing code describes the use of multiple, separate code paths configured to perform similar functionality. For example, different code paths may be configured or designed to generate the same outputs when applied to the same inputs or may be configured or designed to otherwise perform similar functionality. These different code paths designed to perform the same function may be implemented by different engineers or teams such that the resulting code paths are non-identical but designed to achieve the same outcome. These different code paths may also be written in different languages, access different libraries, or otherwise differ while being designed to achieve similar functionality. Each path of the multipathing code may be accessed using a shared interface, such as an Application Program Interface (API) or other interface as can be appreciated.

When a portion of multipathing code is encountered during the execution of an application or other software, state information may be saved that describes a state of execution at the point where the portion of multipathing code is encountered. The state information may describe the values for various registers, memory locations, counters, attributes, and the like. Should an error occur in a code path of the multipathing code, the saved state information may be used as a checkpoint for reverting or rewinding the state of execution of the application to a point prior to executing the code path of the multipathing code where the error occurred. A different code path of the multipathing code may then be executed. This process may be repeated until a code path of the multipathing code is executed without error.

Where a portion of multipathing code is non-deterministic (e.g., where an executed path is non-deterministic) it may be computationally difficult to rewind the state of execution in the event of an error. For example, where a code path modifies some shared memory location or resource, another process or service may access that shared memory location before the error occurs. In order to rewind the state of execution, that shared memory location or resource should have its value restored to its state prior to modification. However, other processes have already accessed potentially erroneous data from that memory location or resource. Accordingly, the other process may also need to have its state of execution rewound or reverted. As interdependencies between processes increases it becomes increasingly more complex to restore the state of execution for non-deterministic code. In contrast, deterministic code lacking these interdependencies would not require these complex steps to rewind its state of execution, making them a better candidate for introducing multipathing code. Accordingly, it may be beneficial to identify deterministic and/or non-deterministic code to identify candidates for multipathing code or to exclude candidates from multipathing code.

With reference now to FIG. 1, shown is an example computing environment according to aspects of the present disclosure. Computing environment 100 contains an example of an environment for the execution of at least some of the computer code involved in performing the various methods described herein, such as a code analysis module 107. In addition to block 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in block 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

For further explanation, FIG. 2 sets forth a flowchart of an example method of tagging deterministic code in artificial intelligence-generated code in accordance with some embodiments of the present disclosure. The method of FIG. 2 may be performed, for example, by the code analysis module 107 of FIG. 1. As an example, in some embodiments, the method of FIG. 2 may be performed in response to a request to compile some AI-generated code or during the compilation of such code. As another example, in some embodiments, the method of FIG. 2 may be performed in response to receiving some code from a generative AI model based on some request or prompt.

The method of FIG. 2 includes receiving 202 code generated by a generative AI model. In some embodiments, receiving 202 code generated by a generative AI model includes receiving the code as output by the generative AI model. For example, the generative AI model may be configured to output code and provide that code to a process or service performing the method of FIG. 2. In some embodiments, receiving 202 code generated by the generative AI model includes loading the code from storage in which the code was stored after being generated by the generative AI model.

In some embodiments, the code generated by the generative AI model includes code generated based on a prompt including a natural language description of some functionality that the code should implement or perform. For example, a prompt to the generative AI model may request code that performs a particular task (e.g., opens a network connection to a particular destination, instantiates a database table having particular features, or any other task as can be appreciated).

In some embodiments, the code generated by the generative AI model includes code in some programming language converted from other code in a different programming language. For example, the generative AI model may be provided with some Cobol code and may be prompted to convert that Cobol code into Java. In examples related to the conversion of code using a generative AI model described below, the code input to the generative AI model is hereinafter referred to as "base code" while the code output by the generative AI model is hereinafter referred to as "converted code."

The method of FIG. 2 also includes identifying 204 at least one portion of code by identifying at least one of: one or more portions of deterministic code or one or more portions of non-deterministic code. As is set forth above, deterministic code includes code that consistently provides the same output if given the same set of inputs. Conversely, non-deterministic code includes code that will not or has the potential to not provide the same output if given the same set of inputs. The portion of code may include a variety of degrees of granularity or scope. For example, the portion of code may include a defined block of code, a particular function or method, multiple blocks of code or functions in combination, and the like.

In some embodiments, identifying 204 at least one portion of code may include identifying 206, in the code, one or more portions of deterministic code. In other words, portions of deterministic code are specifically identified 206 from the code. In some embodiments, identifying 204 at least one portion of code may include identifying 208, in the code, one or more portions of non-deterministic code. In other words, portions of non-deterministic code are specifically identified 208 from the code. In some embodiments, identifying 204 at least one portion of code may include both identifying 206 one or more portions of deterministic code and identifying 208 one or more portions of non-deterministic code. One skilled in the art will appreciate that, in some embodiments, some portions of code may not be identified as deterministic or non-deterministic. For example, analysis of a given portion of code may not definitively determine whether the code is deterministic or non-deterministic.

In some embodiments, identifying 204 the at least one portion of code may be based on one or more user inputs identifying, in the code, portions of deterministic and/or non-deterministic code. For example, in some embodiments, a user may highlight or otherwise select a portion of code and identify, using inputs to a menu, hotkeys, or other inputs, that portion of code as being deterministic or non-deterministic. In other words, in some embodiments, identifying 204 the at least one portion of code may be performed using manual selection of the at least one portion of code by a user.

In some embodiments, identifying 204 the at least one portion of code may be performed dynamically. For example, in some embodiments, identifying 204 the at least one portion of the code may include analyzing the code and applying one or more rules to identify 204 the at least one portion of code. For example, the code may be analyzed to identify particular portions of code (e.g., particular blocks or other subsections of code). The one or more rules may be applied to these portions of code to determine if a given portion of code is deterministic or non-deterministic. For example, in some embodiments, the presence of particular functions known to be non-deterministic (e.g., loading or storing data to or from a shared memory location or resource, loading or storing data to such locations or resources without locking or otherwise restricting access, functions dependent on random number generation) in a portion of code may cause the portion of code to be identified as non-deterministic. As another example, absence of functions known to be non-deterministic in a portion of code may cause the portion of code to be identified as deterministic. For example, a function that only performs mathematical calculations on some input and provides some output may be identified as deterministic. In some embodiments, the code may be provided to a trained model (e.g., a generative AI model or another model as can be appreciated) configured to identify portions of deterministic code and/or portions of non-deterministic code.

In some embodiments, identifying 204 the at least one portion of code may include monitoring execution of the code or portions thereof to identify deterministic or non-deterministic behavior. For example, the code or portions thereof may be repeatedly executed using multiple sets of the same inputs to determine of the output of some portion of code is consistent across all instances of the same input, thereby indicating deterministic code. As another example, execution of an application or code may be monitored in the context of a larger system or a full application to detect unexpected or erroneous output of functions in the code, which may indicate non-deterministic code or potentially non-deterministic code (e.g., excluding that code from being identified as deterministic while not explicitly identifying it as non-deterministic).

The method of FIG. 2 also includes tagging 210 the at least one portion of code. In some embodiments, tagging 210 the at least one portion of code may include tagging, as deterministic code, the identified 206 one or more portions of deterministic code. In some embodiments, tagging 210 the at least one portion of code may include tagging, as non-deterministic code, the identified 208 one or more portions of deterministic code. In some embodiments, tagging 210 the at least one portion of code may include adding, to the code, some non-compilable label or comment that indicates portions of deterministic or non-deterministic code. In some embodiments, tagging 210 the at least one portion of code may include generating some data that indicates, in the code, portions identified as deterministic and/or portions identified as non-deterministic. Accordingly, in some embodiments, tagging 210 the at least one portion of code may include generating 212 metadata identifying the at least one portion of code.

In some embodiments, the metadata may identify, for a given portion of code, where that portion of code is located in the code (e.g., using line numbers, line offsets relative to some function name or other component of code, and the like). In some embodiments, the metadata may identify, for a given portion of code, whether that portion of code was identified as deterministic or non-deterministic. In some embodiments, the metadata may indicate why the given portion of code was identified as deterministic or non-deterministic. For example, the metadata may indicate particular functions in the portion of code that may cause it to be labeled as non-deterministic or may indicate particular rules that caused the portion of code to be labeled as deterministic and/or non-deterministic.

Identifying 204 and tagging 210 code as deterministic and/or non-deterministic provides several advantages, to be described in further detail below. Identifying 206 and tagging 210 one or more portions of deterministic code may allow for multipathing code to be generated for the deterministic code. Moreover, the identified 206 and tagged 210 deterministic code may be provided as feedback and/or training data to the generative AI model to reinforce the production of deterministic code. Identifying 208 and tagging 210 one or more portions of non-deterministic code may be used to restrict or prevent the use of multipathing code for non-deterministic code. Moreover, the identified 208 and tagged 210 non-deterministic code may be provided as feedback and/or training data to the generative AI model to mitigate or reduce future production of non-deterministic code by the generative AI model.

For further explanation, FIG. 3 sets forth a flowchart of an example method of tagging deterministic code in artificial intelligence-generated code in accordance with some embodiments of the present disclosure. The method of FIG. 3 is similar to FIG. 2 in that the method of FIG. 3 also includes receiving 202 code generated by a generative artificial intelligence (AI) model; identifying 204 at least one portion of code by identifying at least one of: one or more portions of deterministic code or one or more portions of non-deterministic code, including: identifying 206, in the code, one or more portions of deterministic code; and identifying 208, in the code, one or more portions of non-deterministic code; and tagging 210 the at least one portion of code.

The method of FIG. 3 differs from FIG. 2 in that the method of FIG. 3 also includes generating 302, responsive to tagging a portion of deterministic code, a portion of multipathing code corresponding to the portion of deterministic code. As is set forth above, multipathing code describes the use of multiple, separate code paths configured to perform similar functionality. When a portion of multipathing code is encountered during the execution of an application or other software, state information may be saved that describes a state of execution at the point where the portion of multipathing code is encountered. The state information may describe the values for various registers, memory locations, counters, attributes, and the like. Should an error occur in a code path of the multipathing code, the saved state information may be used as a checkpoint for reverting or rewinding the state of execution of the application to a point prior to executing the code path of the multipathing code where the error occurred. A different code path of the multipathing code may then be executed.

Generating 302 the multipathing code includes generating, selecting, or identifying some portion of other code different from but functionally identical to the portion of deterministic code. The portion of other code may include, for example, code produced by a different developer, code written in a different language, code accessing or included in a different library, and the like. In some embodiments, generating 302 the multipathing code includes modifying the code to include a reference to an API or other interface for executing multipathing code. For example, an API call for multipathing code may be inserted before the portion of deterministic code or may replace the portion of deterministic code while being configured to execute the portion of deterministic code first.

Although the method of FIG. 3 describes the use of generating multipathing code in response to a portion of deterministic code being tagged, tagged portions of non-deterministic code may also affect the use of multipathing code. For example, where multipathing code may be automatically or dynamically added to the code, portions of code tagged as non-deterministic may be prevented from being included in the multipathing code. As another example, when compiling or performing some other action with respect to code that includes multipathing code, a warning may be generated or compilation may be prevented in response to detecting multipathing code that includes some non-deterministic code.

For further explanation, FIG. 4 sets forth a flowchart of an example method of tagging deterministic code in artificial intelligence-generated code in accordance with some embodiments of the present disclosure. The method of FIG. 4 is similar to FIG. 3 in that the method of FIG. 4 also includes receiving 202 code generated by a generative artificial intelligence (AI) model; identifying 204 at least one portion of code by identifying at least one of: one or more portions of deterministic code or one or more portions of non-deterministic code, including: identifying 206, in the code, one or more portions of deterministic code; and identifying 208, in the code, one or more portions of non-deterministic code; tagging 210 the at least one portion of code; and generating 302, responsive to tagging a portion of deterministic code, a portion of multipathing code corresponding to the portion of deterministic code.

The method of FIG. 4 differs from FIG. 3 in that generating 302, responsive to tagging a portion of deterministic code, a portion of multipathing code corresponding to the portion of deterministic code also includes selecting 402 other code for the portion of multipathing code from base code. In the example method of FIG. 3, assume that the code received from the generative AI model includes converted code in some programming language that was generated from base code in a different programming language. For example, the base code may include code written in Cobol that was converted, by the generative AI model, into converted code written in Java.

Here, the other code for the portion of multipathing code (e.g., the code path that will be executed should an error occur when executing the portion of deterministic code) is selected from the base code from which the deterministic converted code was generated. Particularly, the other code selected from the base code may include the portion of the base code from which the deterministic converted code was generated by the generative AI model. Thus, should execution of the deterministic converted code experience an error, the portion of base code from which the deterministic converted code was generated will be executed.

This approach provides for additional resiliency in AI-generated code. For example, assume that the base code is written in a legacy programming language but is known to be functional and resilient. The base code may be converted into a different programming language to run on modern computing systems more optimally. Should an error occur in the converted code, the base code, known to be reliable and functional, may instead be executed by using multipathing code. Moreover, this approach enables multipathing code without the need to manually write different, functionally equivalent code by using known functionally equivalent code in a different programming language.

Figure 5:
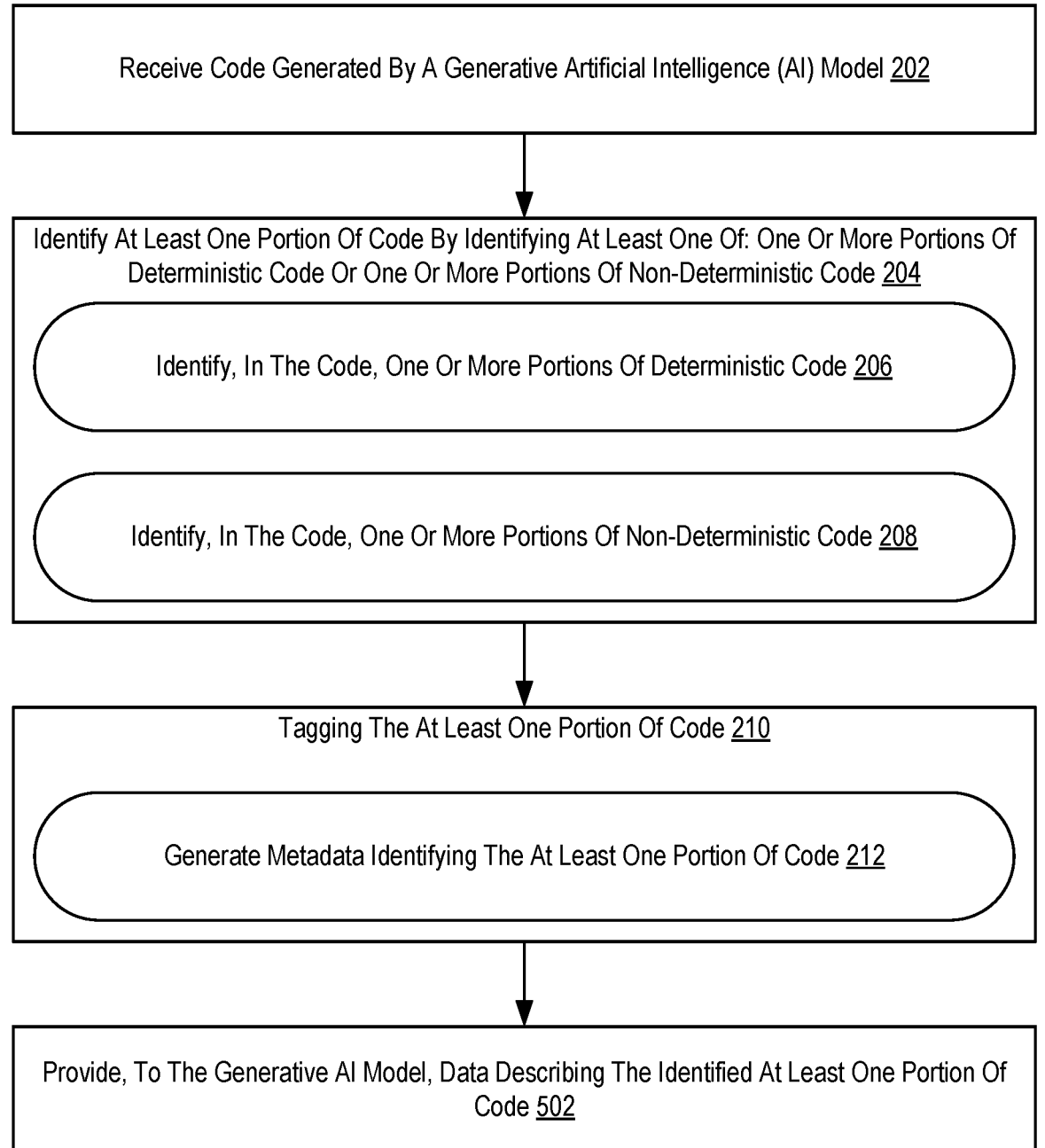
FIG. 5 sets forth a flowchart of another example method for tagging deterministic code in artificial intelligence-generated code in accordance with some embodiments of the present disclosure.

For further explanation, FIG. 5 sets forth a flowchart of an example method of tagging deterministic code in artificial intelligence-generated code in accordance with some embodiments of the present disclosure. The method of FIG. 3 is similar to FIG. 2 in that the method of FIG. 3 also includes receiving 202 code generated by a generative artificial intelligence (AI) model; identifying 204 at least one portion of code by identifying at least one of: one or more portions of deterministic code or one or more portions of non-deterministic code, including: identifying 206, in the code, one or more portions of deterministic code; and identifying 208, in the code, one or more portions of non-deterministic code; and tagging 210 the at least one portion of code.

The method of FIG. 5 differs from FIG. 2 in that the method of FIG. 5 also includes providing 502, to the generative AI model, data describing the identified at least one portion of code. In some embodiments, the data provided 502 to the generative AI model may include the generated 212 metadata described above. In some embodiments, the data provided 502 to the generative AI model may be based on or include various data points from the generated 212 metadata. For example, the data provided 502 to the generative AI model may identify particular portions of deterministic and/or non-deterministic code, provide indications as to why particular portions of code were identified as deterministic or non-deterministic, and the like.

In some embodiments, the data provided 502 to the generative AI model may include training data for retraining the generative AI model. Put differently, the generative AI model may be retrained based on previously generated code and identifications of deterministic and/or non-deterministic code. This provides several advantages related to the use of the generative AI model in generating code. For example, by indicating, to the generative AI model, portions of deterministic code, this may reinforce and promote generation of deterministic code by the generative AI model. As another example, by indicating, to the generative AI model, portions of non-deterministic code, this may mitigate or reduce the amount of non-deterministic code produced by the generative AI model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving code generated by a generative artificial intelligence (AI) model;

executing the code;

determining whether the code includes deterministic code or non-deterministic code;

identifying, within the code and based on an output of executing the code, at least one portion of code by identifying at least one of: one or more portions of deterministic code or one or more portions of non-deterministic code; and tagging the at least one portion of code; and generating, responsive to tagging a portion of deterministic code, a portion of multipathing code corresponding to the portion of deterministic code, wherein the portion of multipathing code comprises other code in a first programming language and the portion of deterministic code is encoded in a second programming language different than the first programming language.

2. The method of claim 1, wherein identifying at least one portion of code comprises identifying, in the code, one or more portions of deterministic code.

3. The method of claim 1, identifying at least one portion of code comprises identifying, in the code, one or more portions of non-deterministic code.

4. The method of claim 1, wherein the code generated by the generative AI model comprises converted code in the second programming language converted by the generative AI model from base code in the first programming language, and wherein generating the portion of multipathing code comprises selecting the other code from the base code.

5. The method of claim 1, further comprising providing, to the generative AI model, data describing the at least one portion of code.

6. The method of claim 5, wherein the data is provided as training data for retraining the generative AI model.

7. The method of claim 1, wherein tagging the at least one portion of code comprises generating metadata identifying the at least one portion of code.

8. The method of claim 7, wherein the metadata identifies a location of the at least one portion of code in the code and identifies whether the at least one portion of code was identified as deterministic or non-deterministic.

9. An apparatus comprising:

a processing device; and memory operatively coupled to the processing device, wherein the memory stores computer program instructions that, when executed, cause the processing device to:

receive code generated by a generative artificial intelligence (AI) model;

execute the code;

determine whether the code includes deterministic code or non-deterministic code;

identify, within the code and based on an output of executing the code, at least one portion of code by identifying at least one of: one or more portions of deterministic code or one or more portions of non-deterministic code;

tag the at least one portion of code; and generate, responsive to tagging a portion of deterministic code, a portion of multipathing code corresponding to the portion of deterministic code, wherein the portion of multipathing code comprises other code in a first programming language and the portion of deterministic code is encoded in a second programming language different than the first programming language.

10. The apparatus of claim 9, wherein the instructions, that cause the processing device to identify at least one portion of code, further cause the processing device to identify, in the code, one or more portions of deterministic code.

11. The apparatus of claim 9, wherein the instructions, that cause the processing device to identify at least one portion of code, further cause the processing device to identify, in the code, one or more portions of non-deterministic code.

12. The apparatus of claim 9, wherein the code generated by the generative AI model comprises converted code in the second programming language converted by the generative AI model from base code in the first programming language, and wherein the instructions, that cause the processing device to generate the portion of multipathing code, further cause the processing device to select the other code from the base code.

13. The apparatus of claim 9, wherein the instructions, when executed, further cause the processing device to provide, to the generative AI model, data describing the at least one portion of code.

14. The apparatus of claim 13, wherein the data is provided as training data for retraining the generative AI model.

15. The apparatus of claim 9, wherein the instructions, that cause the processing device to tag the at least one portion of code, further cause the processing device to generate metadata identifying the at least one portion of code.

16. The apparatus of claim 15, wherein the metadata identifies a location of the at least one portion of code in the code and identifies whether the at least one portion of code was identified as deterministic or non-deterministic.

17. A computer program product comprising a computer readable storage medium, wherein the computer readable storage medium comprises computer program instructions that, when executed:

receive code generated by a generative artificial intelligence (AI) model;

execute the code;

determine whether the code includes deterministic code or non-deterministic code;

identify, within the code and based on an output of executing the code, at least one portion of code by identifying at least one of: one or more portions of deterministic code or one or more portions of non-deterministic code;

tag the at least one portion of code; and generate, responsive to tagging a portion of deterministic code, a portion of multipathing code corresponding to the portion of deterministic code, wherein the portion of multipathing code comprises other code in a first programming language and the portion of deterministic code is encoded in a second programming language different than the first programming language.

18. The computer program product of claim 17, wherein the computer program instructions, that identify the at least one portion of code, further identify, in the code, one or more portions of deterministic code.

19. The computer program product of claim 17, wherein the computer program instructions, that identify the at least one portion of code, further identify, in the code, one or more portions of non-deterministic code.

20. The computer program product of claim 17, wherein the code generated by the generative AI model comprises converted code in the second programming language converted by the generative AI model from base code in the first programming language, and wherein the computer program instructions, that generate the portion of multipathing code, select the other code from the base code.

21. The computer program product of claim 17, wherein the computer program instructions, when executed, provide, to the generative AI model, data describing the at least one portion of code.

22. The computer program product of claim 21, wherein the data is provided as training data for retraining the generative AI model.

23. The computer program product of claim 17, wherein the computer program instructions, that tag the at least one portion of code, further generate metadata identifying the at least one portion of code.

24. The computer program product of claim 23, wherein the metadata identifies a location of the at least one portion of code in the code and identifies whether the at least one portion of code was identified as deterministic or non-deterministic.

\* \* \* \* \*